(12) United States Patent
Busnardo

(10) Patent No.: US 10,647,529 B2
(45) Date of Patent: May 12, 2020

(54) PACKING DEVICE FOR CONSUMABLE MATERIALS

(71) Applicant: Ryan Burl Busnardo, Corona, CA (US)

(72) Inventor: Ryan Burl Busnardo, Corona, CA (US)

(73) Assignee: PMG COS. L.L.C., Corona, CA (US)

( * ) Notice: Subject to any disclaimer, the term of this patent is extended or adjusted under 35 U.S.C. 154(b) by 0 days.

(21) Appl. No.: 16/374,650

(22) Filed: Apr. 3, 2019

(65) Prior Publication Data

US 2019/0308827 A1 Oct. 10, 2019

Related U.S. Application Data

(60) Provisional application No. 62/652,629, filed on Apr. 4, 2018.

(51) Int. Cl.
*B65G 59/06* (2006.01)
*A47F 1/10* (2006.01)
*B65G 59/10* (2006.01)

(52) U.S. Cl.
CPC ............ *B65G 59/062* (2013.01); *A47F 1/106* (2013.01); *B65G 59/105* (2013.01)

(58) Field of Classification Search
CPC .. A24C 5/42; A24C 5/52; A24D 1/022; A24D 3/0229; B65G 59/062; B65G 59/105; A47F 1/106
See application file for complete search history.

(56) References Cited

U.S. PATENT DOCUMENTS

| 495,258 A | * | 4/1893 | Mott | .......................... A24F 1/30 131/221 |
| 638,887 A | * | 12/1899 | Root | ........................ A24C 5/42 131/75 |

(Continued)

FOREIGN PATENT DOCUMENTS

| CN | 201905194 | 7/2011 |
| CN | 202414517 | 9/2012 |

(Continued)

OTHER PUBLICATIONS

International Search Report and Written Opinion in corresponding International Patent Application No. PCT/US2019/025664, dated Aug. 7, 2019, in 13 pages.

(Continued)

*Primary Examiner* — Ko H Chan
(74) *Attorney, Agent, or Firm* — Knobbe, Martens, Olson & Bear, LLP

(57) ABSTRACT

A packing device for consumable materials comprising an outer sleeve, an inner sleeve, and springs. The outer sleeve and inner sleeve may matingly and telescopically engage with each other and the inner sleeve may be slideably moveable between a resting position and a compressed position. The inner sleeve may have (a) an interior chamber that is configured to engage with a cone and (b) a consumable material loading chamber. The springs may be configured to create a tension when the inner sleeve is slideably moved from the resting position to the compressed position by a user, such that the inner sleeve is slideably biased into the resting position when the inner sleeve is released by the user, such that when a consumable material is loaded into the consumable material loading chamber, the consumable material is packed into the cone.

18 Claims, 21 Drawing Sheets

(56) References Cited

U.S. PATENT DOCUMENTS

| | | | |
|---|---|---|---|
| 1,299,050 A * | 4/1919 | Southmayd | A24C 5/42 131/75 |
| 2,427,884 A | 2/1945 | Snodgrass | |
| 2,594,747 A | 12/1948 | Laney | |
| 4,572,216 A | 2/1986 | Josuttis et al. | |
| 8,011,372 B2 * | 9/2011 | Neumann | A24C 5/42 131/70 |
| 8,545,913 B2 | 10/2013 | Daouse et al. | |
| 9,179,706 B2 | 11/2015 | Jespersen et al. | |
| 9,504,268 B2 | 11/2016 | Wang | |
| 9,814,259 B1 * | 11/2017 | Richmond | A24C 5/42 |
| 10,306,918 B2 * | 6/2019 | Sinclair, Jr. | A24D 1/022 |
| 2013/0233329 A1 | 9/2013 | Sebastian et al. | |
| 2014/0261471 A1 | 9/2014 | Ruzycky | |
| 2017/0119043 A1 * | 5/2017 | Swanson | A24C 5/42 |
| 2018/0213838 A1 * | 8/2018 | Richmond | A24C 5/44 |
| 2018/0222694 A1 | 8/2018 | Burgess et al. | |

FOREIGN PATENT DOCUMENTS

| | | |
|---|---|---|
| CN | 105235944 | 1/2016 |
| CN | 105815534 | 8/2016 |
| CN | 107685474 | 2/2018 |
| CN | 208070133 | 11/2018 |
| EP | 1374705 A1 | 1/2004 |
| GB | 2124882 A | 2/1984 |
| KR | 20-2010-0006529 U | 6/2010 |
| WO | 2013087801 | 6/2013 |
| WO | 2018050687 | 3/2018 |
| WO | WO 2019/195477 A1 | 10/2019 |

OTHER PUBLICATIONS

420 STOCK, How to Fill 84 mm JWare Cone Loader, https://www.youtube.com/watch?v=OdeT_nhR9fk, May 18, 2017, in 22 pages.

amazon.com, Raw Natural Rolling Papers Cone Filler—Cone Shooter Machine (1 ¼ size), in 8 pages.

Mountainhighcones, Filling Unit, https://www.youtube.com/watch?v=ReCQt42dGEY, Oct. 20, 2011, in 7 pages.

The "How to" DIY Pros, Cones 120 Site Preroll Machine. How to use it!, https://www.youtube.com/watch?v=GlAWHInne7I, Dec. 17, 2017, in 158 pages.

Weed Tuber, RAW Six Shooter Review, https://www.youtube.com/watch?v=jfnjohe0OJ8, Dec. 28, 2018, in 30 pages.

Raw Cone Maker, Rolling Paper Depot, Retrieved from https://www.rollingpaperdepot.com/pre-rolled-cones/cone-filling-machines/raw-cone-maker.html (last visited Apr. 3, 2019).

\* cited by examiner

PACKING DEVICE FOR CONSUMABLE MATERIALS

CROSS-REFERENCE TO RELATED APPLICATIONS

This U.S. Non-Provisional patent application claims the benefit of U.S. Provisional Patent Application No. 62/652,629, filed on Apr. 4, 2018, by inventor Ryan Burl Busnardo, the contents of which are expressly incorporated herein by this reference as though set forth in their entirety.

FIELD OF USE

The present disclosure relates generally to the field of packing devices and methods of using packing devices, and more specifically, to a spring-loaded packing device for packing various types of consumable materials into a cone shaped holder, wrapper, or rolling paper.

BACKGROUND

Manually operated packing devices, such as cigarette rolling machines, are designed to allow a user to make, fill, and pack a substantially cylindrical cigarette. The user first places the consumable material, such as dried plant matter, tobacco, cannabis, and the like, into a space between two cylindrical rollers. After packing the material to the desired density, the user inserts rolling paper, which is effectively wrapped around the consumable material until a cylindrical cigarette is formed. Current consumable packing devices do not allow a user to create product or cigarette that is substantially conical and filling a cone-shaped paper or wrapper densely is very difficult to do by hand. Thus, what is needed is a packing device for loading conical papers easily and to a desired density.

SUMMARY

To minimize the limitations in the cited references, and to minimize other limitations that will become apparent upon reading and understanding the present specification, the present specification discloses a new and improved packing device for consumable materials.

The packing device of the present disclosure may comprise two mating and telescopic tubes or sleeves that are spring-loaded such that when the inner sleeve (male sleeve) is pulled up, the springs push down on a base of the inner sleeve, pushing it back into its lower resting position. In this manner, the inner sleeve snaps downward and comes to an abrupt stop at its lower resting position. When a conical or cone-shaped paper is loaded into an interior chamber of the inner sleeve, and then a consumable material is placed in or at the mouth of the cone, the material packs into the bottom of the cone. When done repeatedly, the user can pack the cone to the desired fill level and density. To make the pack of a higher density, the device may be articulated up and down repeatedly and/or the base of the device may be put on a solid surface, such that the stopping is more abrupt and the material packs harder downward toward the tip of the cone.

In one embodiment the packing device comprises an outer sleeve, and inner sleeve, and one or more springs. The one or more springs may be positioned between the inner sleeve and the outer sleeve. More specifically, the spring(s) may be positioned within a spring notch on the outer surface of the inner sleeve and between a protrusion on an inner surface of the outer sleeve (sometimes called the female sleeve) and a base protrusion on the inner sleeve. The packing force delivered by the device of the present disclosure may be increased by increasing the number of springs used or increasing the tension force of the springs. The packing force delivered by the device of the present disclosure may be decreased by decreasing the number of springs used or decreasing the tension force of the springs.

The packing device may be sturdy, portable, hand-held, effective, and easy to operate.

It is an object to overcome the limitations of the prior art.

One embodiment may be a packing device for consumable materials, comprising: an outer sleeve; an inner sleeve; and one or more springs. The outer sleeve may be hollow and may be configured to matingly and telescopically engage with the inner sleeve and may be slideably moveable between a resting position and a compressed position. The inner sleeve may comprise (a) an interior chamber that is configured to engage with a cone and (b) a consumable material loading chamber. The one or more springs may be configured to create a tension when the inner sleeve is slideably moved from the resting position to the compressed position by a user, such that the inner sleeve is slideably biased into the resting position when the inner sleeve is released by the user, such that when a consumable material is loaded into the consumable material loading chamber, the consumable material is packed into the cone. The outer sleeve may comprise one or more protrusions on an inner surface, wherein each of the one or more protrusions may be configured to engage with a top of one of the one or more springs, such that when the inner sleeve is slideably moved from a resting position to a compressed position, the one or more spring compress against the one or more protrusions. The one or more protrusions may be removable screws that pass through the outer sleeve and protrude proximally from the inner surface of the outer sleeve. The inner sleeve may further comprise one or more spring notches that may be configured to nestingly engage with the one or more springs, such that the one or more springs may be held substantially in place and are prevented from deforming laterally when compressed. Each of the one or more spring notches may comprise a spring notch top shoulder and a spring notch bottom shoulder, such that there are one or more spring notch top shoulders and one or more spring notch bottom shoulders. The one or more spring notch bottom shoulders may be positioned at a base of the inner sleeve and wherein each of the one or more spring notch bottom shoulders may be configured to engage with a bottom of the one or more springs when the inner sleeve is slideably moved from the resting position to the compressed position. The base of the inner sleeve may have an aperture that may be configured to allow the user to access the cone in the interior chamber of the inner sleeve. The base of the inner sleeve may be configured to impact a solid flat surface, which allows the user to more densely pack the cone with the consumable material. The inner sleeve may have a top lip. The device may be configured to allow the user to repeatedly articulate the inner sleeve from a resting position to a compressed position in order to more densely pack the cone. The device may be configured to allow the user to repeatedly articulate the inner sleeve from a resting position to a compressed position in order to pack additional batches of the consumable material into the cone.

Another embodiment may be a method of packing consumable materials into a cone, comprising the steps: providing a packing device, wherein the packing device comprises an outer sleeve, an inner sleeve, one or more compression springs, and one or more protrusion screws;

wherein the outer sleeve may be hollow and may be configured to matingly and telescopically engage with the inner sleeve; wherein the inner sleeve matingly and telescopically engages within the outer sleeve and may be slideably moveable between a resting position and a compressed position; wherein the inner sleeve comprises (a) an interior chamber that may be configured to engage with a cone, (b) a consumable material loading chamber, and (c) one or more spring notches that are configured to engage with the one or more compression springs, such that the one or more compression springs are held substantially in place and are prevented from deforming laterally when compressed; wherein the one or more compression springs are configured to create a tension when the inner sleeve may be slideably moved from the resting position to the compressed position by a user, such that the inner sleeve may be slideably biased into the resting position when the inner sleeve may be released by the user, such that when a consumable material may be loaded into the consumable material loading chamber, the consumable material may be packed into the cone; loading a cone into the inner sleeve; loading the consumable material into the consumable material loading chamber; articulating the inner sleeve from the resting position to the compressed position; and releasing the inner sleeve, such that the inner sleeve snaps back to the resting position, such that the consumable material packs into the cone. The method may further comprise the steps: repeating the steps of (a) loading the consumable material into the consumable material loading chamber, (b) articulating the inner sleeve from the resting position to the compressed position, and (c) releasing the inner sleeve, such that the inner sleeve snaps back to the resting position, such that the consumable material packs into the cone. In other embodiments, the method may further comprise the steps: repeating the steps of (a) articulating the inner sleeve from the resting position to the compressed position, and (b) releasing the inner sleeve, such that the inner sleeve snaps back to the resting position, such that the consumable material packs into the cone. In some embodiments, the one or more protrusion screws pass through the outer sleeve and protrude proximally from the inner surface of the outer sleeve; wherein the inner sleeve further comprises one or more spring notches that are configured to engage with the one or more compression springs, such that the one or more compression springs are held substantially in place and are prevented from deforming laterally when compressed. Each of the one or more spring notches may comprise a spring notch top shoulder and a spring notch bottom shoulder, such that there are one or more spring notch top shoulders and one or more spring notch bottom shoulders; and wherein the one or more spring notch bottom shoulders are positioned at a base of the inner sleeve and wherein each of the one or more spring notch bottom shoulders are configured to engage with a bottom of the one or more compression springs when the inner sleeve may be slideably moved from the resting position to the compressed position. The base of the inner sleeve has an aperture that may be configured to allow the user to access the cone in the interior chamber of the inner sleeve. The base of the inner sleeve may be configured to impact a solid flat surface, which may allow the user to more densely pack the cone with the consumable material;

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF ILLUSTRATIVE EMBODIMENTS

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Figure 1:
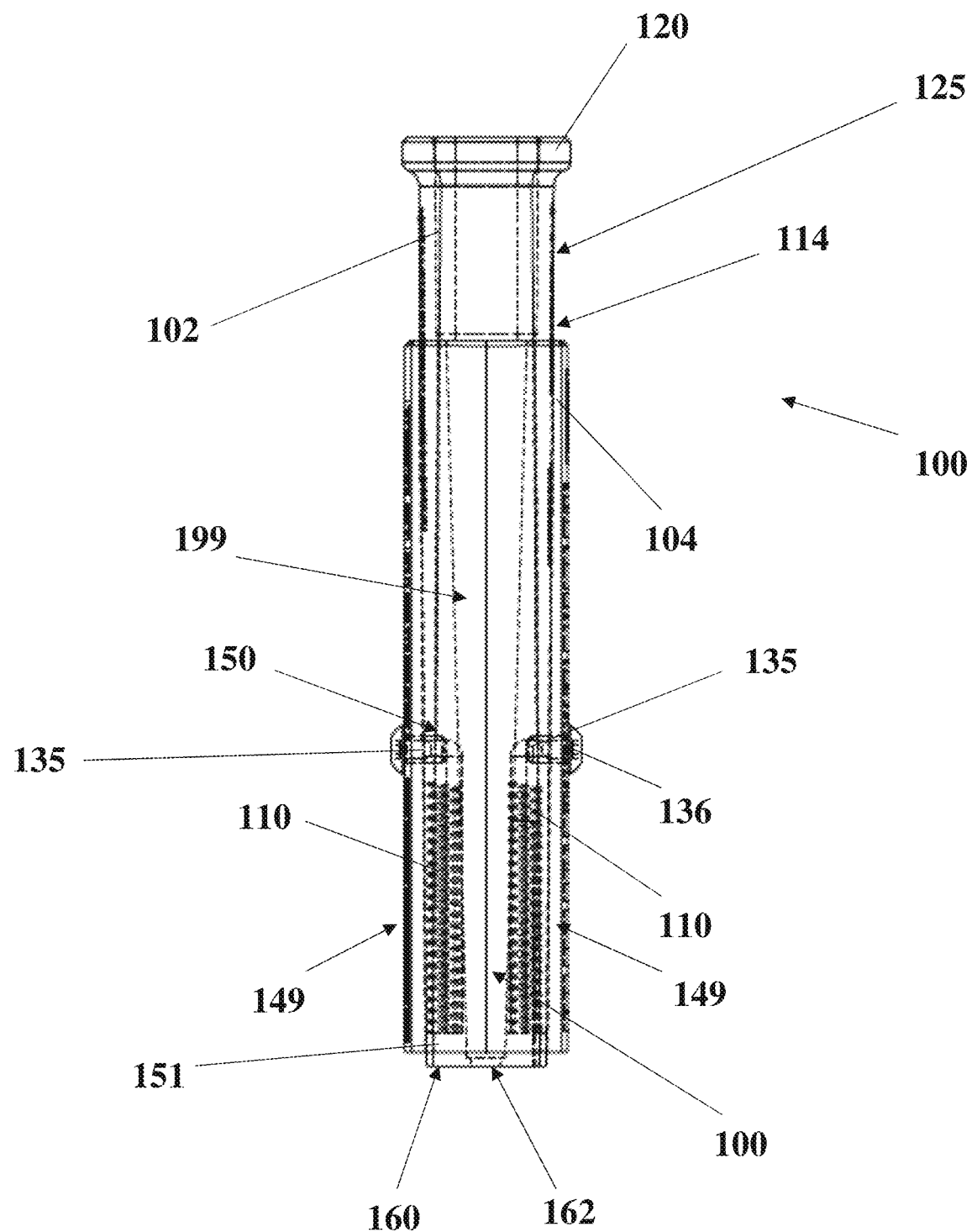
FIG. 1 is an illustration of a transparent side view of one embodiment of the packing device.

FIG. 1 is an illustration of a transparent side view of one embodiment of the packing device. The packing device 100 may comprise an inner sleeve 102, outer sleeve 104, and springs 110. As shown, the inner sleeve 102 may be configured to fit matingly and telescopically 114 within an interior of outer sleeve 104. The inner sleeve 102 may have a top lip 120, which may function as a handle for the user to slidingly pull the inner sleeve 102 up from a resting position within the outer sleeve 104.

FIG. 1 shows that the device 100 is in a resting position, wherein a top portion 125 of the inner sleeve 102 is not contained within the outer sleeve 104. The inner sleeve 102 is slidable within outer sleeve 104, such that the inner sleeve 102 may piston up and down within the outer sleeve 104. One or more protrusions 135 may extend inward from an inner surface of the outer sleeve 104. FIG. 1 shows that the protrusions 135 may be screws with an exterior screw head 136. The protrusions 135 may be a pin, bolt, rivet, and the like. Preferably protrusions 135 are removable, so that the inner sleeve 102 may be entirely removable or disengaged from the outer sleeve 104 for cleaning or maintenance. The protrusions 135 preferably may contact spring notch top shoulders 150 of the spring notches 149 of inner sleeve 102, such that the inner sleeve 102 is prevented from sliding further down within outer sleeve 104. The protrusions 135 may also engage or contact a top of the springs 110, which may be positioned between an inner surface of the outer sleeve 104 and the spring notches 149 of the inner sleeve 102. The spring notches 149 may end at spring notch bottom shoulders 151 which may be positioned at a base 160 of inner sleeve 102. The base 160 may have an aperture 162. When the user pulls up on the inner sleeve 102 (while keeping the outer sleeve substantially immobile), the shoulders 151 compress the springs 110, which are prevented from laterally deforming by the outer sleeve 104 and the sides of the spring notches 149. The springs may cause a downward tension or force on the inner sleeve 102, such that when a user releases the inner sleeve 102, the device returns to its resting position.

FIG. 1 also shows that the inner sleeve may be substantially hollow with a conical interior chamber 199 that tapers from wide to narrow from the top to the bottom. The interior chamber 199 may be configured to accept and matingly hold a cone. The cone may be a cone wrapper, cone rolling paper, or conical holder. The cone may be configured to accept a consumable material, such as tobacco, herbs, or other ground or shredded plant matter.

FIG. 1 shows that in the resting position of the device 100, the bottom of the inner sleeve may be lower than the bottom of the out sleeve. In this manner, when the device 100 is placed on a flat surface and operated, it is the flat surface that arrests the downward movement of the inner sleeve, and not the protrusions 136.

Although the inner and outer sleeve are shown as being generally rectangular in these drawings and having softer cut corners, any shape may be used (cylindrical, triangular, polygonal, octagonal, and the like), so long as the inner and outer sleeves matingly, telescopically, and slideably nest and piston with respect to each other.

The springs 110 may be compression springs, as shown. However, any spring, elastic, or tension device may be used, so long as the inner sleeve is tensioned downward when being pulled up. In a non-limiting example, an elastic bungie or tension/extension spring could be used to pull the inner sleeve down when pulled upward. As shown in the drawings, these embodiments are beneficial because they do not require the spring to be mechanically or adhesively coupled to the inner sleeves, protrusions, or outer sleeves.

Figure 2:
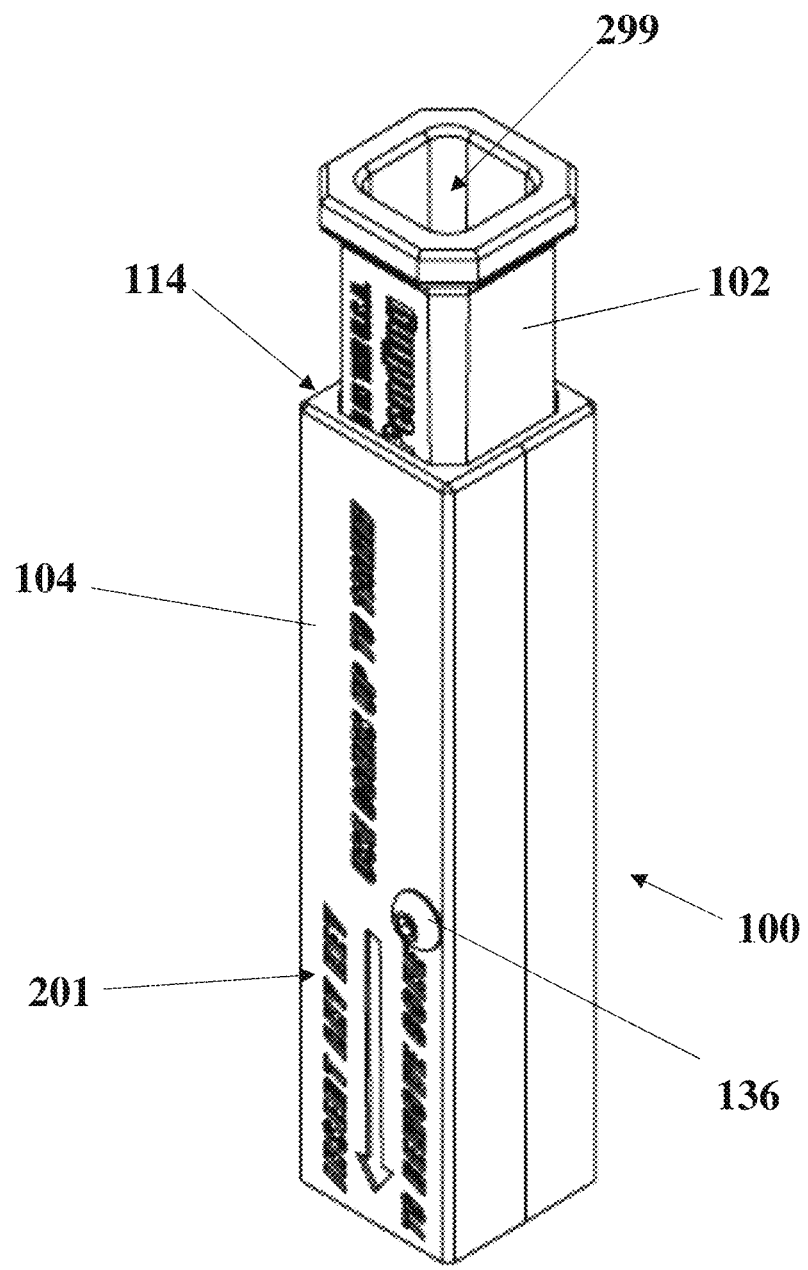
FIG. 2 is an illustration of a perspective view of one embodiment of the packing device.

FIG. 2 is an illustration of a perspective view of one embodiment of the packing device. As shown in FIG. 2, the device 100 may comprise inner sleeve 102, outer sleeve 104, screw head 136, and details 201. The details 201 may be instructions, branding, and the like. The inner sleeve 102 may have an opening 299 to the hollow interior chamber 199 (shown in FIG. 1) that matingly accepts a cone-shaped rolling paper. The screw head 136 of protrusion 135 shows where the protrusion 135 may be situated to restrict the telescoping/sliding 114 movement of the inner sleeve 102 within the outer sleeve 104. Although the inner sleeve 102 movement may be restricted, it preferably may piston up and down within outer sleeve 104 at a height that allows sufficient g-force to pack the cone. The device 100 may preferably be made up of a rigid and durable material, such as plastic, metal, wood, or composites.

Figure 3:
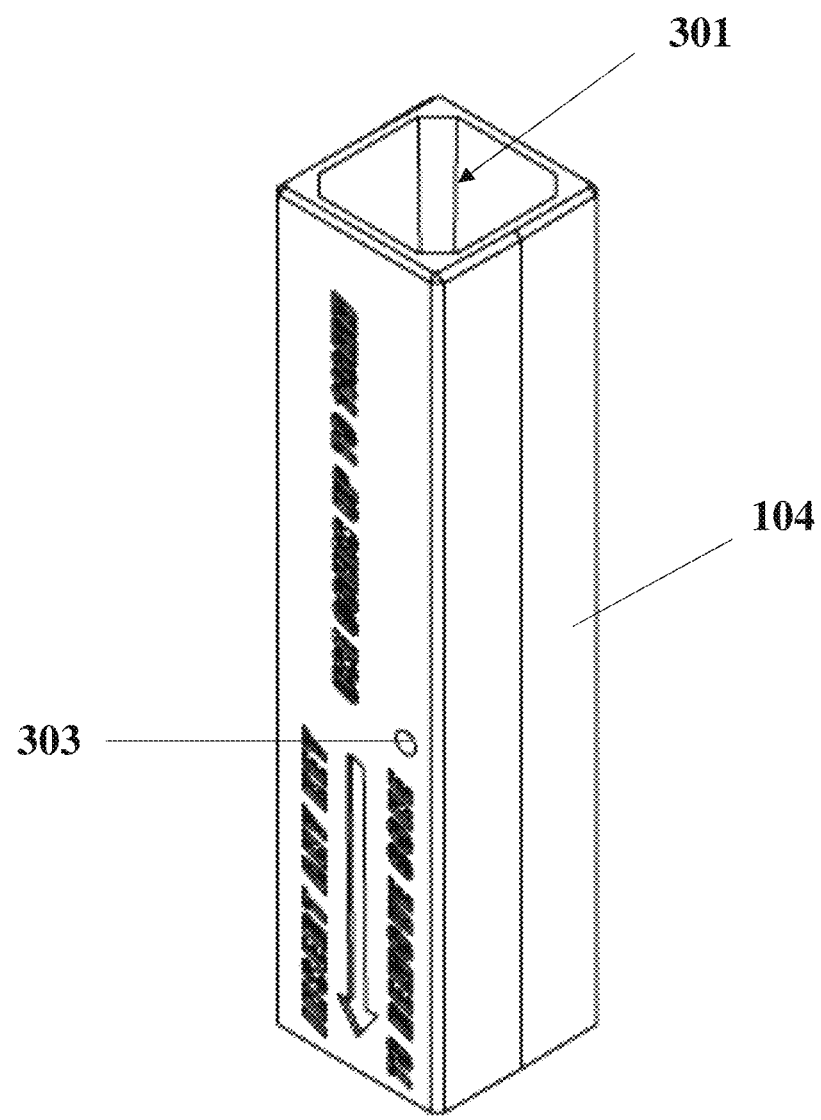
FIG. 3 is an illustration of a perspective view of one embodiment of an outer sleeve of the packing device.

FIG. 3 is an illustration of a perspective view of one embodiment of an outer sleeve of the packing device. FIG. 3 shows that the outer sleeve 104 may have a hollow interior chamber 301, which may be configured to matingly engage with an exterior surface of the inner sleeve. The outer sleeve 104 may have a hole 303, which may be a pilot hole that allows the protrusion or screw to pass through to an interior of the outer sleeve 104.

Figures 4A, 4B:
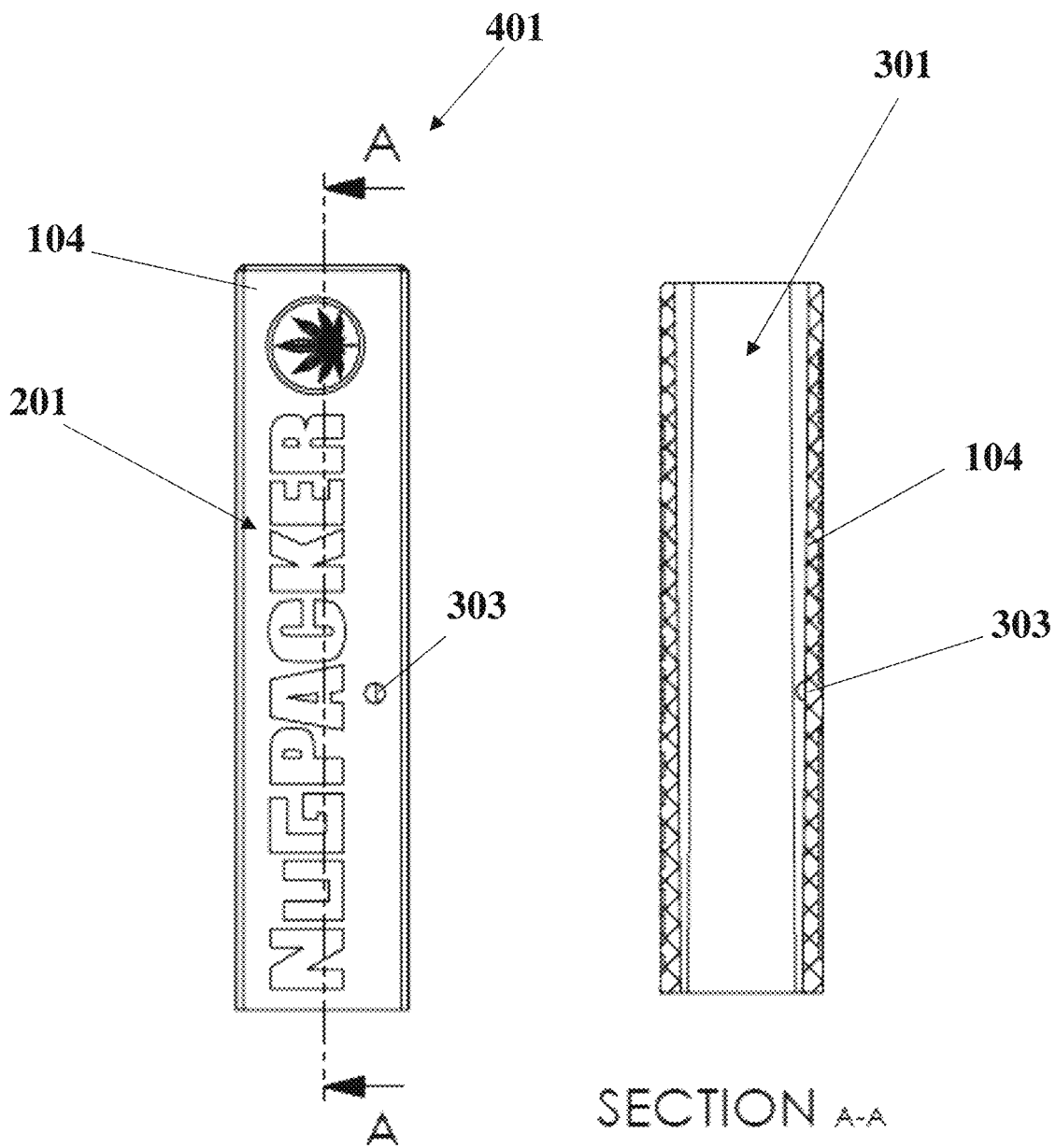
FIG. 4a is an illustration of a side view of one embodiment of an outer sleeve of the packing device.
FIG. 4b is an illustration of a cross-section side view of one embodiment of an outer sleeve of the packing device.

FIG. 4a is an illustration of a side view of one embodiment of an outer sleeve of the packing device. Section A-A 401 is shown in FIG. 4b. The outer sleeve 104 may have branding and designs 201 and hole 303.

FIG. 4b is an illustration of a cross-section side view of one embodiment of an outer sleeve of the packing device. FIG. 4b shows that the outer sleeve 104 may be hollow with no cap or base covering, which allows the inner sleeve 102 to piston through the outer sleeve 104.

Figure 5:
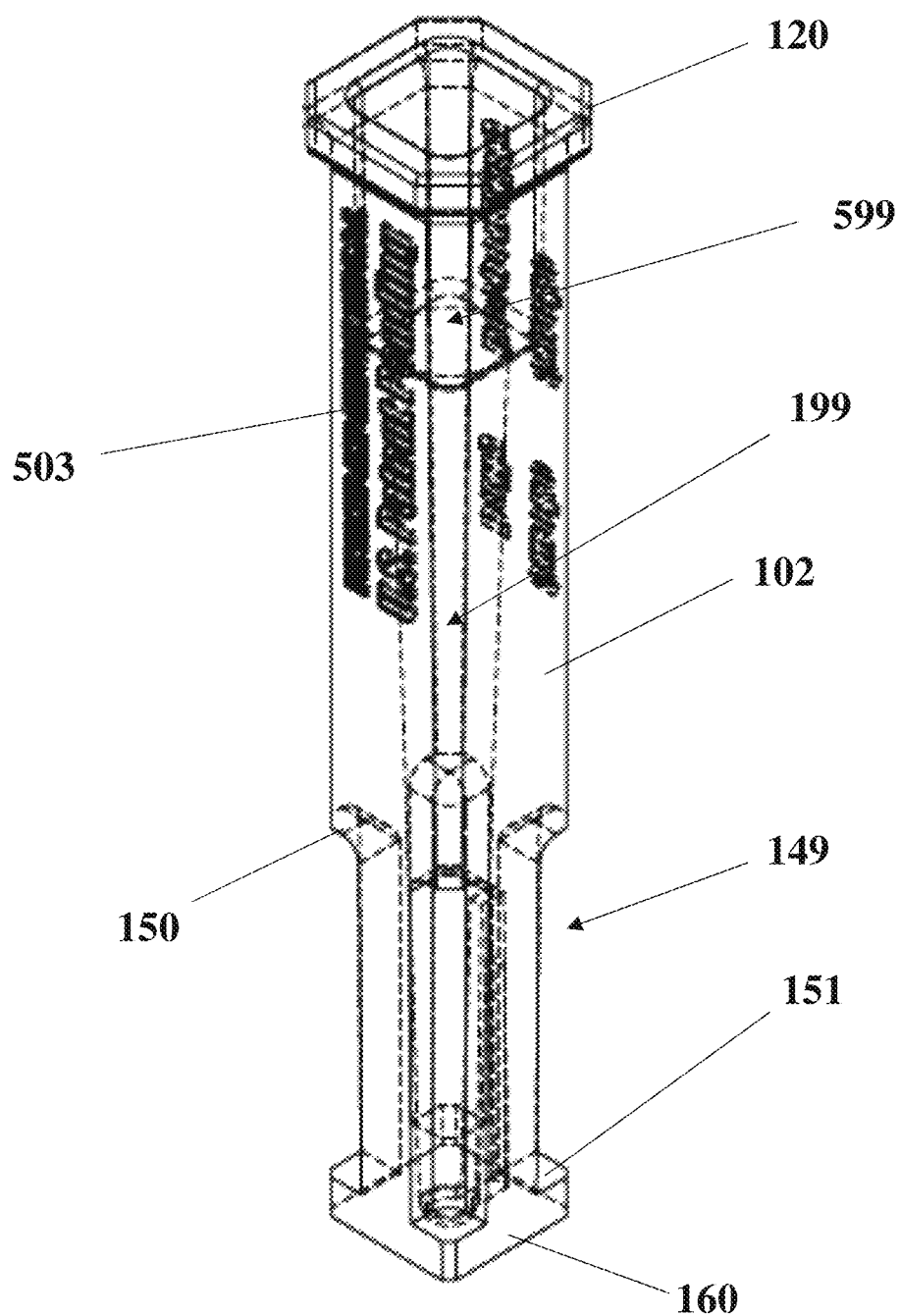
FIG. 5 is an illustration of a transparent perspective view of one embodiment of an inner sleeve of the packing device.

FIG. 5 is an illustration of a transparent perspective view of one embodiment of an inner sleeve of the packing device. FIG. 5 shows that the inner sleeve may comprise a lip 120, interior loading chamber 599, cone-shaped interior chamber 199, spring notches 149, and base 160. Although four spring notches are shown, there may be as few as one or an indefinite number. Each spring notch 149 may have a spring notch top shoulder 150 and a spring notch bottom shoulder 151. The top and bottom of the spring may be generally bounded by the top shoulder 150 and bottom shoulder 151, respectively.

Figure 6:
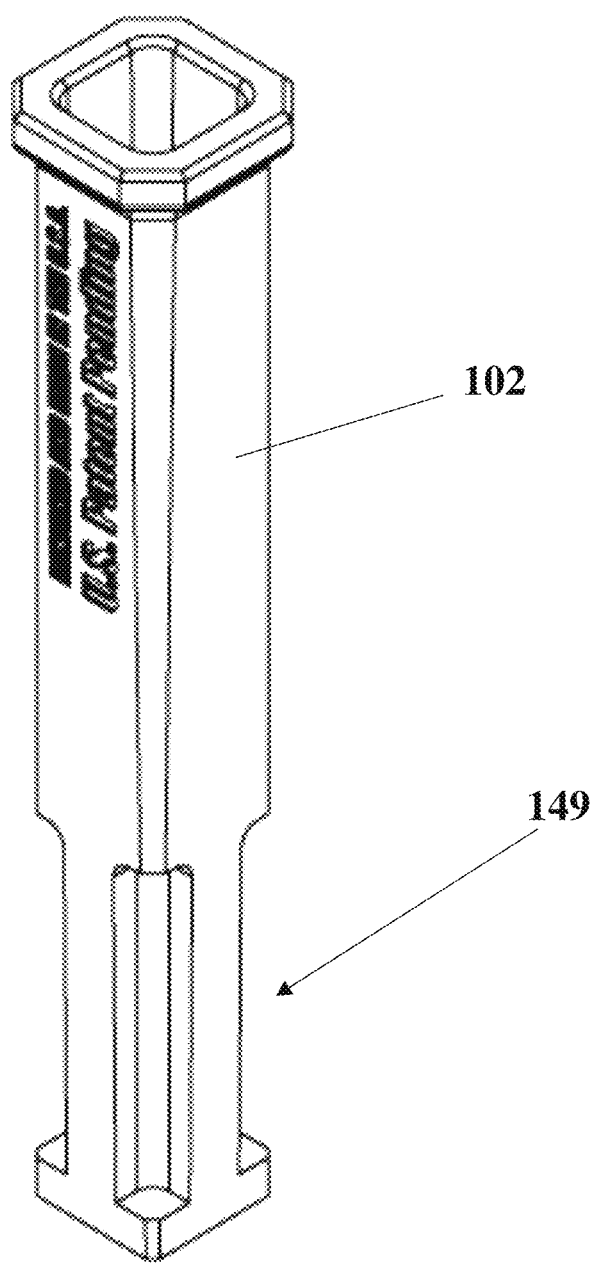
FIG. 6 is an illustration of a perspective view of one embodiment of an inner sleeve of the packing device.

FIG. 6 is an illustration of a perspective view of one embodiment of an inner sleeve of the packing device. The inner sleeve 102 may have four spring notches 149 that are configured to each hold a compression spring. For this embodiment, four is the preferably number of notches 149 because the sleeve is generally square and only having three would make the inner sleeve uneven. Because the inner sleeve 102 pistons up and down, it should be balanced so that it goes up and down (pistons or biases) smoothly. Preferably, the device 100 includes the number of springs that allow a balanced snapback of the inner sleeve. For the present embodiment, preferably two or four springs are used. In a triangular embodiment, three springs may be preferable. The shape may determine how many springs are optimal.

Figures 7A, 7B:
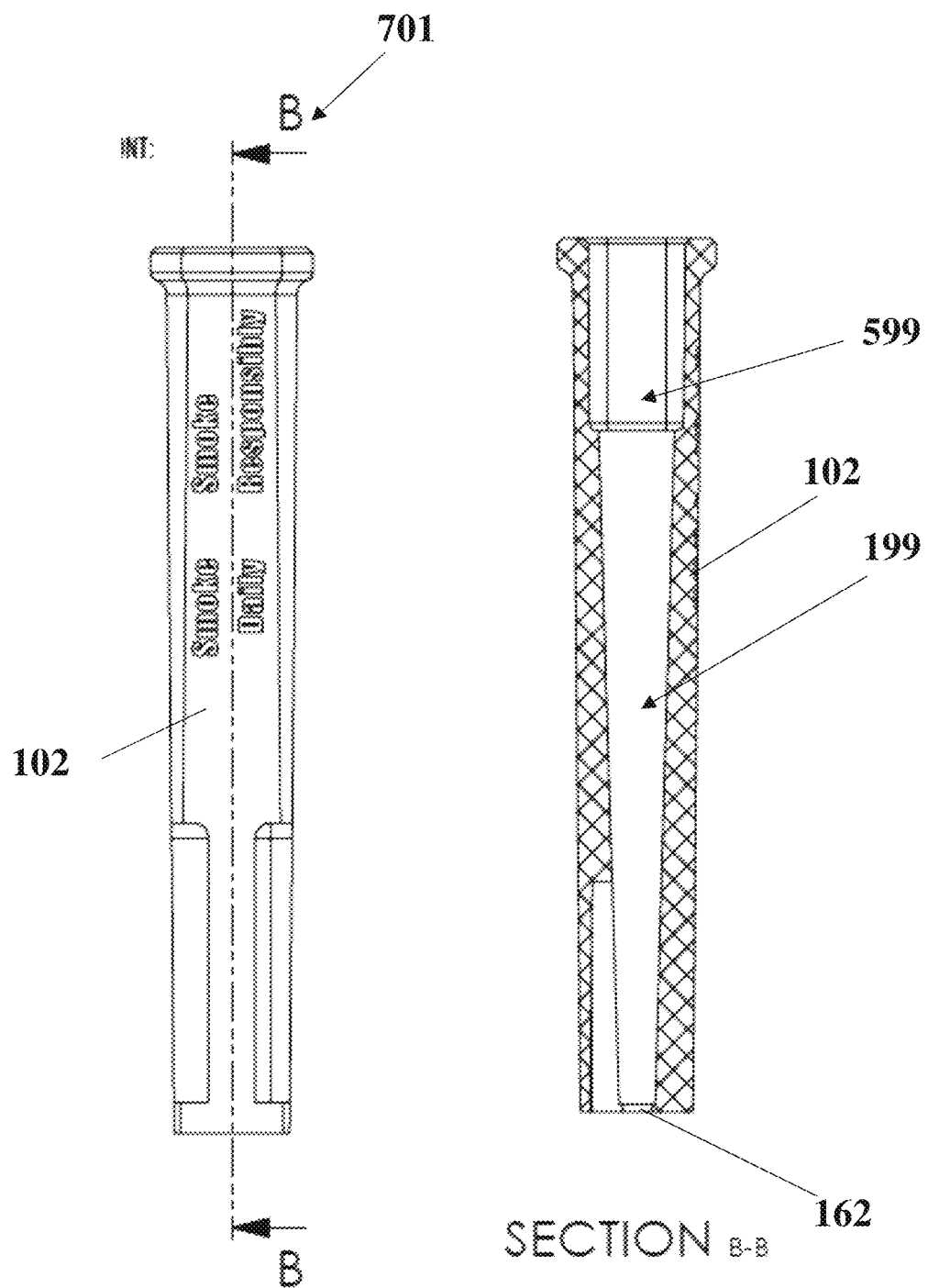
FIG. 7a is an illustration of a side view of one embodiment of an inner sleeve of the packing device.
FIG. 7b is an illustration of a cross-section side view of one embodiment of an inner sleeve of the packing device.

FIG. 7a is an illustration of a side view of one embodiment of an inner sleeve of the packing device. Section B-B 701 is shown in FIG. 7b.

FIG. 7b is an illustration of a cross-section side view of one embodiment of an inner sleeve of the packing device. FIG. 7b shows that the inner sleeve 102 may have an interior loading chamber 599, cone-shaped interior chamber 199, and bottom hole/aperture 162. The interior chamber 199 is preferably conical so as to be configured to matingly engage with a conical rolling paper that is loaded within the interior chamber 199. The loading chamber allows the user to place consumable materials within the inner sleeve, which are then packed into a cone that is loaded into the interior chamber 199.

Figure 8:
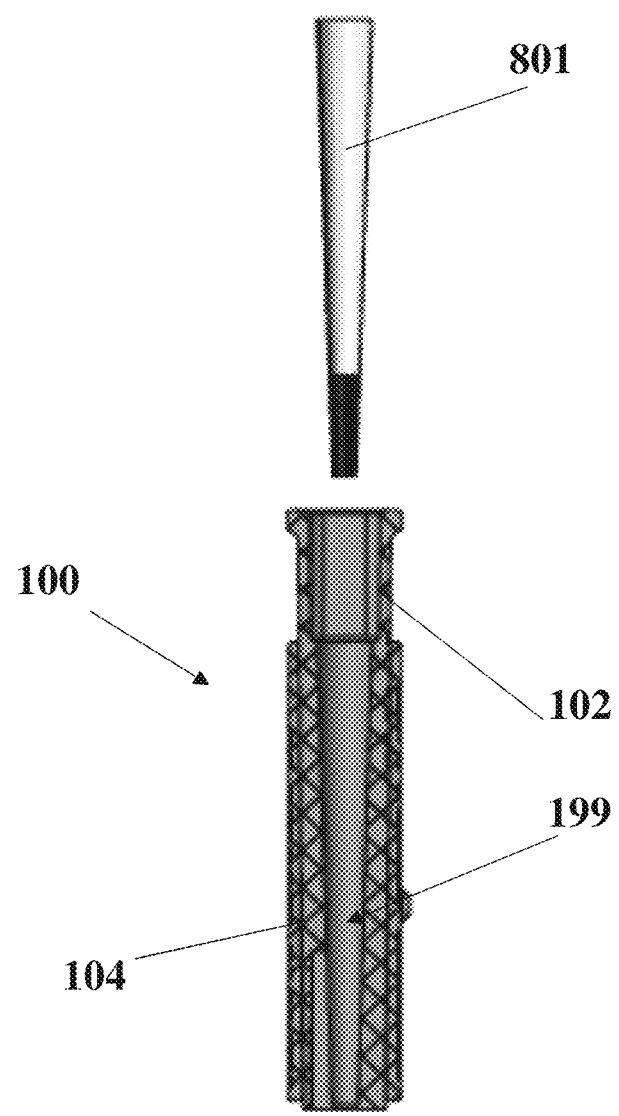
FIG. 8 is an illustration of a cross-section view of one embodiment of the packing device showing a cone wrapper about to be loaded into the inner sleeve.

FIG. 8 is an illustration of a cross-section view of one embodiment of the packing device showing a cone wrapper about to be loaded into the inner sleeve. The interior chamber 199 may be cone-shaped to accept cone 801.

Figure 9:
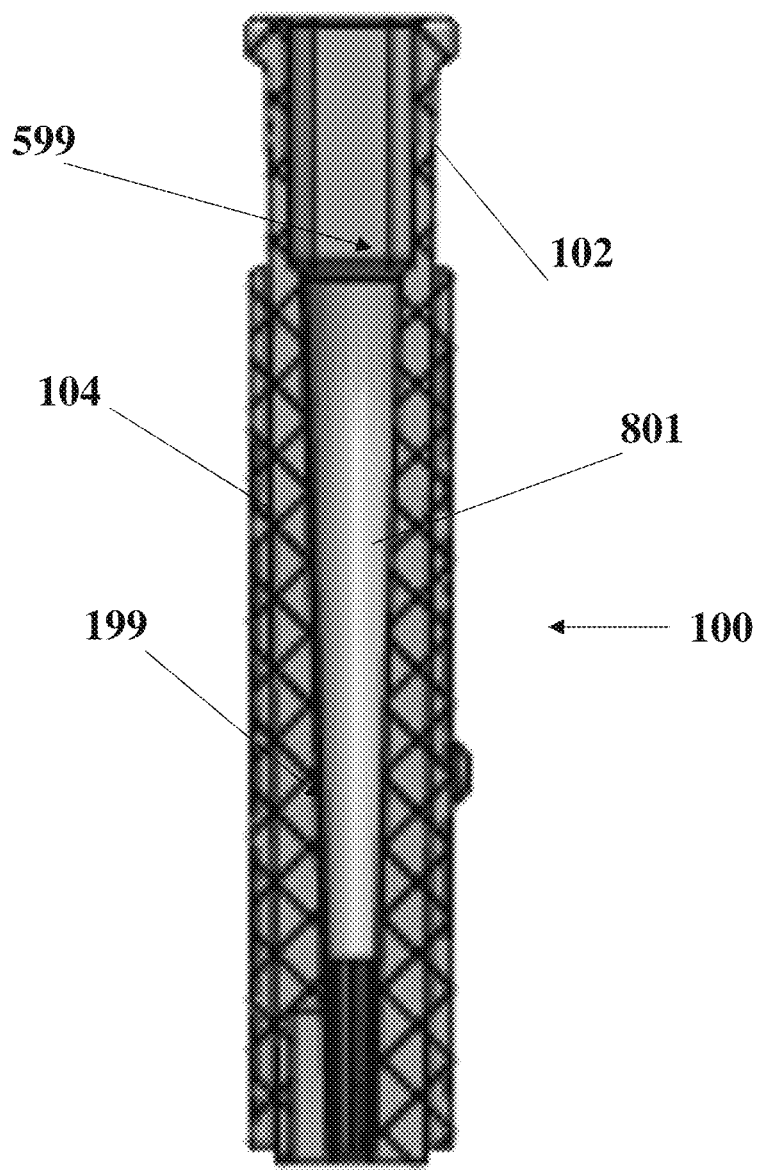
FIG. 9 is an illustration of a cross-section view of one embodiment of the packing device showing a cone wrapper loaded into the inner sleeve.

FIG. 9 is an illustration of a cross-section view of one embodiment of the packing device showing a cone wrapper loaded into the inner sleeve. The cone 801 may be held snuggly and matingly within interior chamber 199 of inner sleeve 102. The cone may be just below loading chamber 599, such that any material put into loading chamber 599 may be packed down into cone 801.

Figure 10:
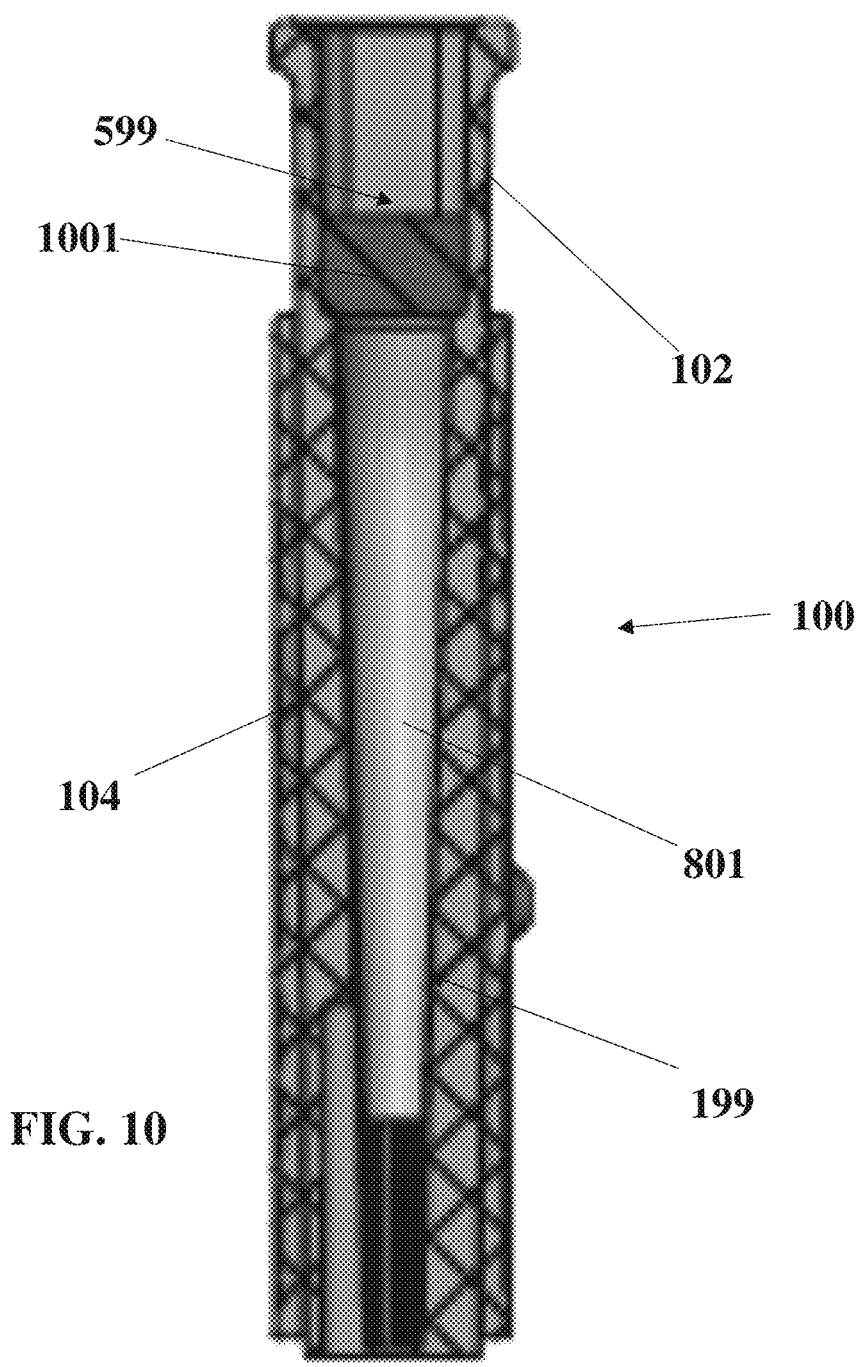
FIG. 10 is an illustration of a cross-section view of one embodiment of the packing device showing a cone wrapper loaded into the inner sleeve and showing a consumable material loaded into the top of the cone wrapper.

FIG. 10 is an illustration of a cross-section view of one embodiment of the packing device showing a cone wrapper loaded into the inner sleeve and showing a consumable material loaded into the top of the cone wrapper. The consumable material 1001 may be loaded into loading chamber 599 when the device 100 is in a resting position.

Figure 11:
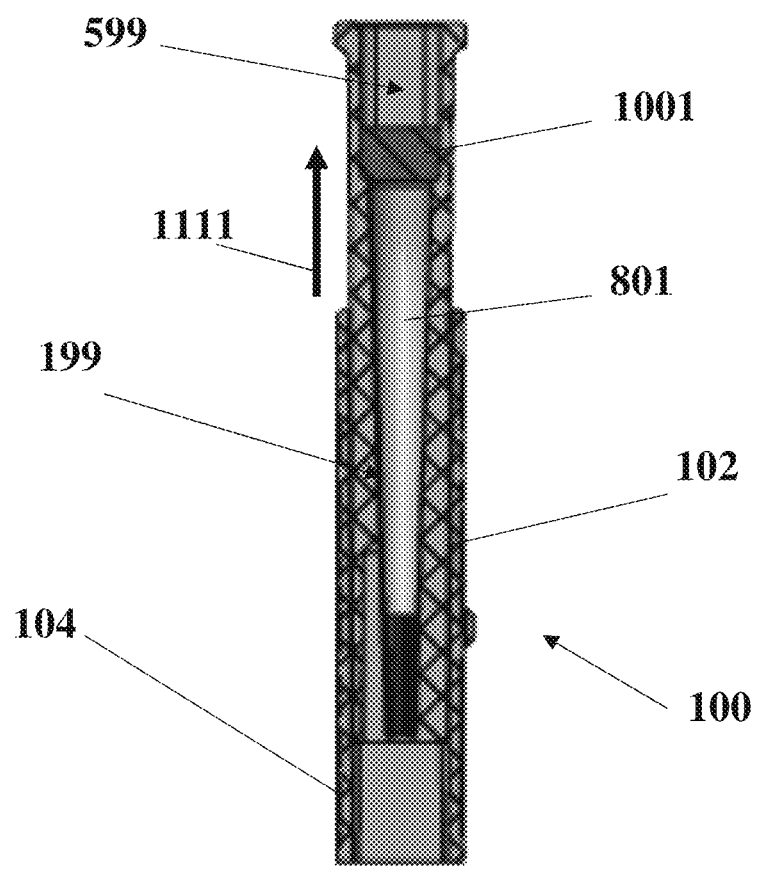
FIG. 11 is an illustration of a cross-section view of one embodiment of the packing device showing that the inner sleeve has been pulled distally away from the outer sleeve.

FIG. 11 is an illustration of a cross-section view of one embodiment of the packing device showing that the inner sleeve has been pulled distally away from the outer sleeve. As the inner sleeve 102 is pulled up 1111, the outer sleeve 104 is held in place, either in the user's hand (in preferably a firm manner), or held firmly and perpendicularly against a stable flat surface. The act of pulling the inner sleeve 102 up causes the springs to compress, which puts tension on the inner sleeve 102 to snap back (bias) downward.

Figure 12:
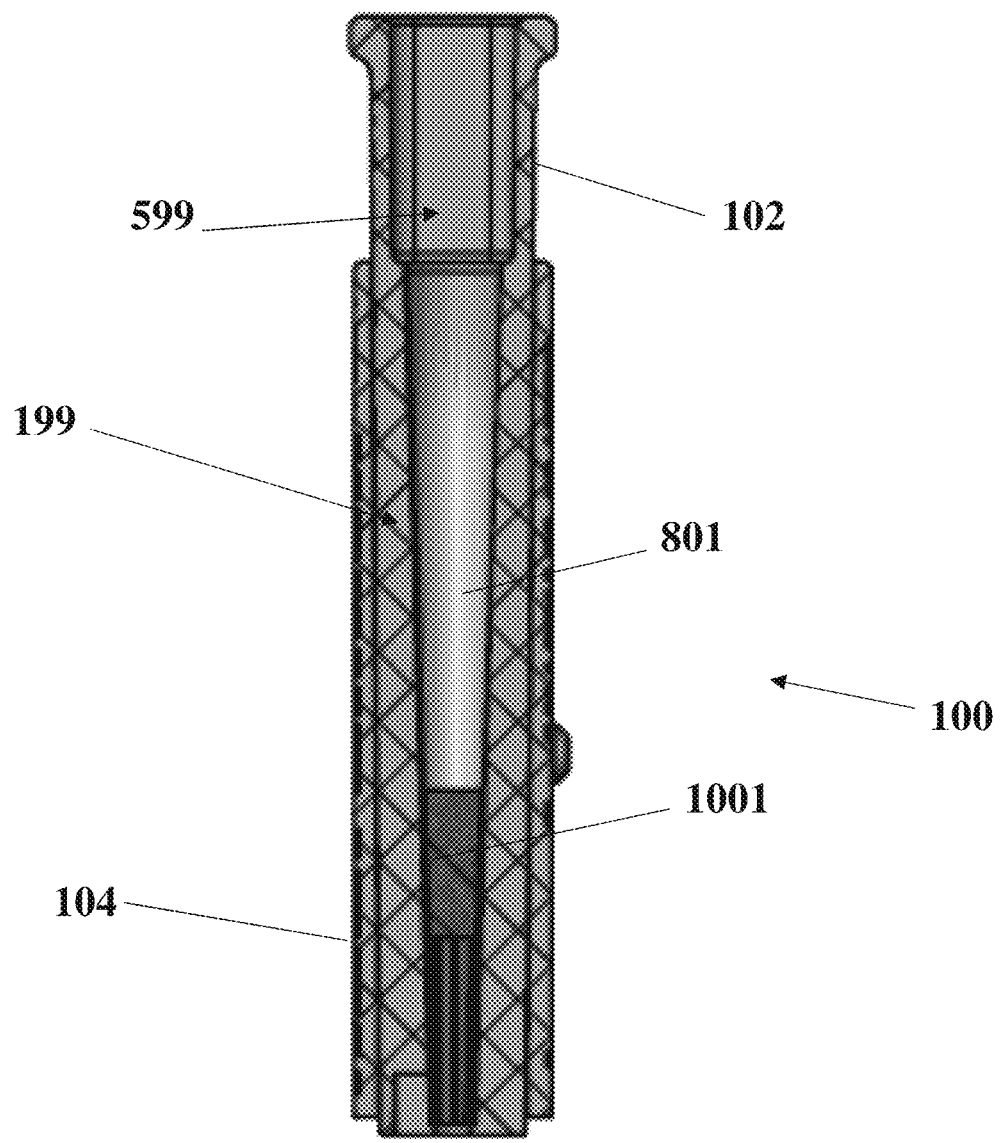
FIG. 12 is an illustration of a cross-section view of one embodiment of the packing device showing that the inner sleeve has been released back into the resting position and the consumable material has been packed into the tip of the cone as a result of the downward force.

FIG. 12 is an illustration of a cross-section view of one embodiment of the packing device showing that the inner sleeve has been released back into the resting position and the consumable material has been packed into the tip of the cone as a result of the downward force. During use of the device 100, the consumable material 1001 may be packed into the tip of the cone 801. The packing force is created when the inner sleeve 102 comes to an abrupt stop with respect to the outer sleeve 104. The consumable material 1001 does not stop with the inner sleeve 102 and falls down into the cone 801, where the tip of the cone 801 stops the consumable material 1001. The more articulations that are done and the more force exerted by the springs, may cause the consumable material to be packed tighter and tighter (more densely).

Figure 13:
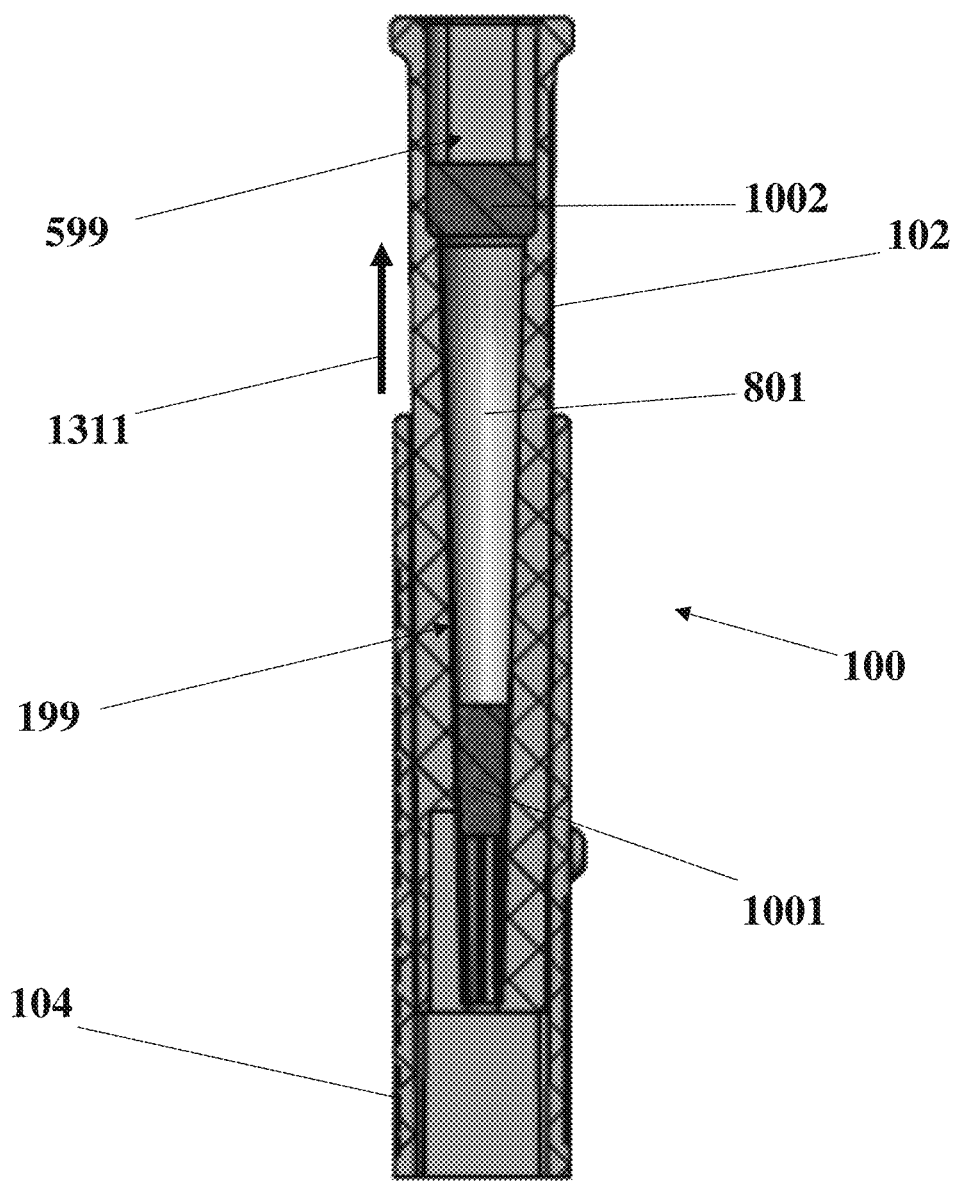
FIG. 13 is an illustration of a cross-section view of one embodiment of the packing device showing that more consumable product has been loaded at the top opening of the cone and that the inner sleeve has been pulled distally away from the outer sleeve.

FIG. 13 is an illustration of a cross-section view of one embodiment of the packing device showing that more consumable product has been loaded at the top opening of the cone and that the inner sleeve has been pulled distally away from the outer sleeve. The loading chamber 599 may be loaded with a second batch of consumable products 1002. As the inner sleeve 102 is pulled up 1311, the outer sleeve 104 is held in place, either in the user's hand, or held firmly against a stable flat surface. The act of pulling the inner sleeve 102 up causes the springs to compress, which puts tension on the inner sleeve 102 to snap back (bias) downward.

Figure 14:
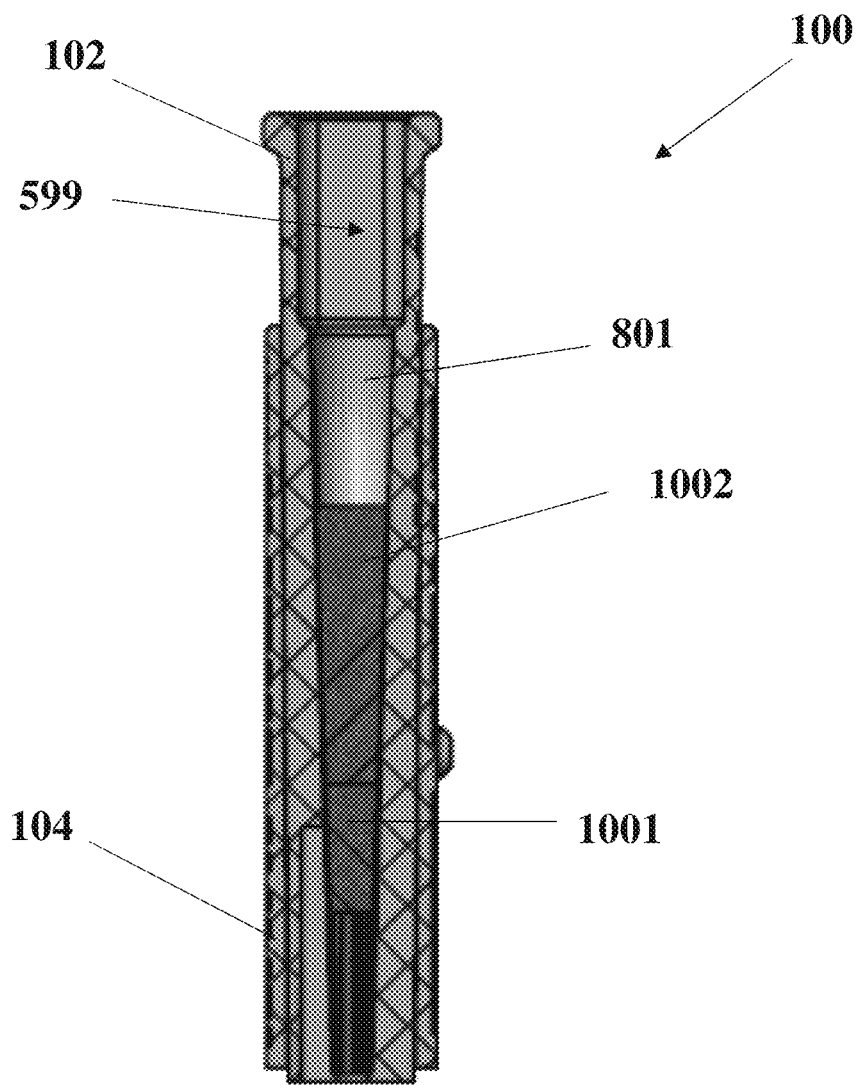
FIG. 14 is an illustration of a cross-section view of one embodiment of the packing device showing that the inner sleeve has been released back into the resting position and the additional consumable material has been packed on top of the first consumable material in the cone.

FIG. 14 is an illustration of a cross-section view of one embodiment of the packing device showing that the inner sleeve has been released back into the resting position and the additional consumable material has been packed on top of the first consumable material in the cone. The consumable material 1002 is shown on top of consumable material 1001, and both are packed in cone 801.

Figure 15:
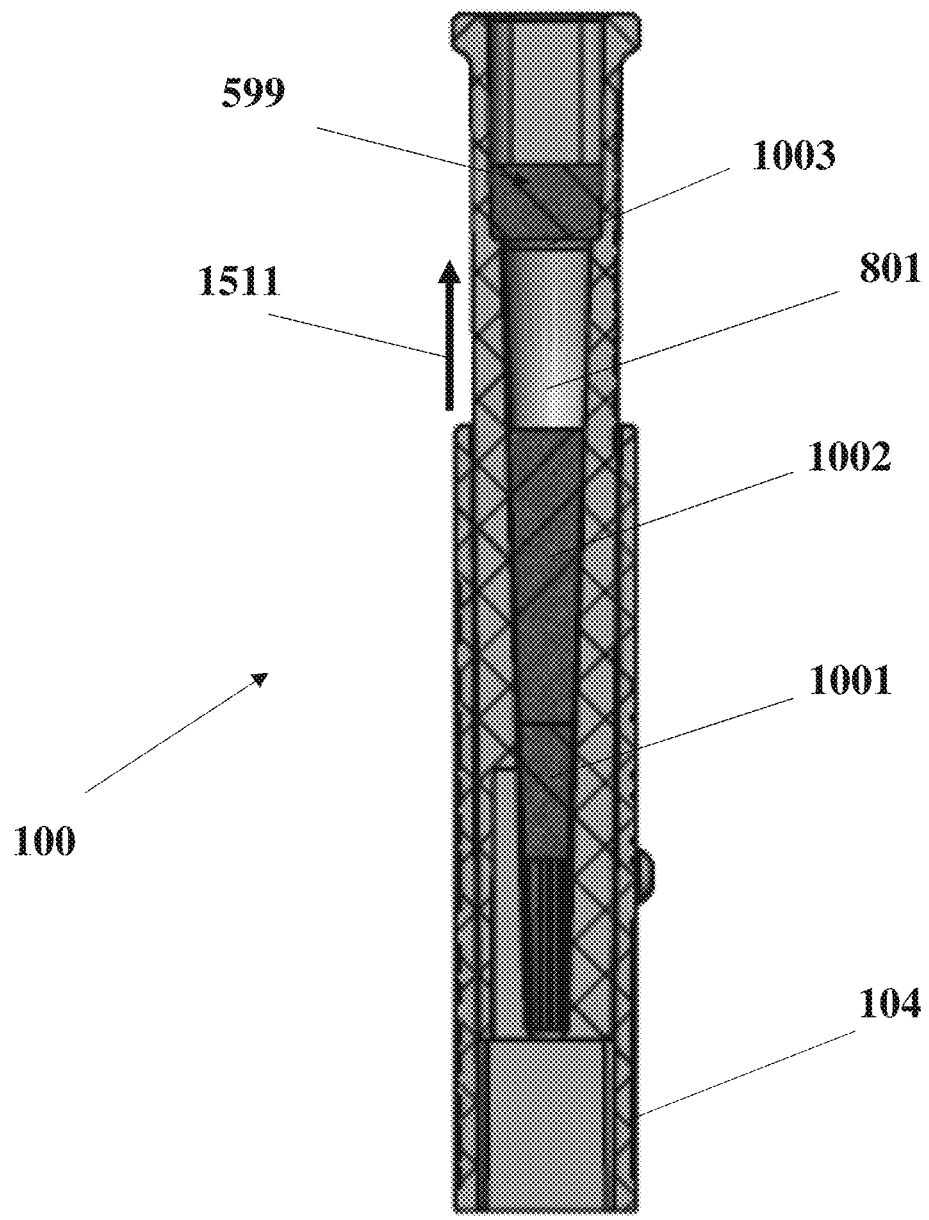
FIG. 15 is an illustration of a cross-section view of one embodiment of the packing device showing that a third round of consumable product has been loaded at the top opening of the cone and that the inner sleeve has been pulled distally away from the outer sleeve.

FIG. 15 is an illustration of a cross-section view of one embodiment of the packing device showing that a third round of consumable product has been loaded at the top opening of the cone and that the inner sleeve has been pulled distally away from the outer sleeve. The loading chamber 599 may be loaded with a third batch of consumable products 1003. As the inner sleeve 102 is pulled up 1511, the outer sleeve 104 is held in place, either in the user's hand, or held firmly against a stable flat surface. The act of pulling the inner sleeve 102 up causes the springs to compress, which puts tension on the inner sleeve 102 to snap back (bias) downward.

Figure 16:
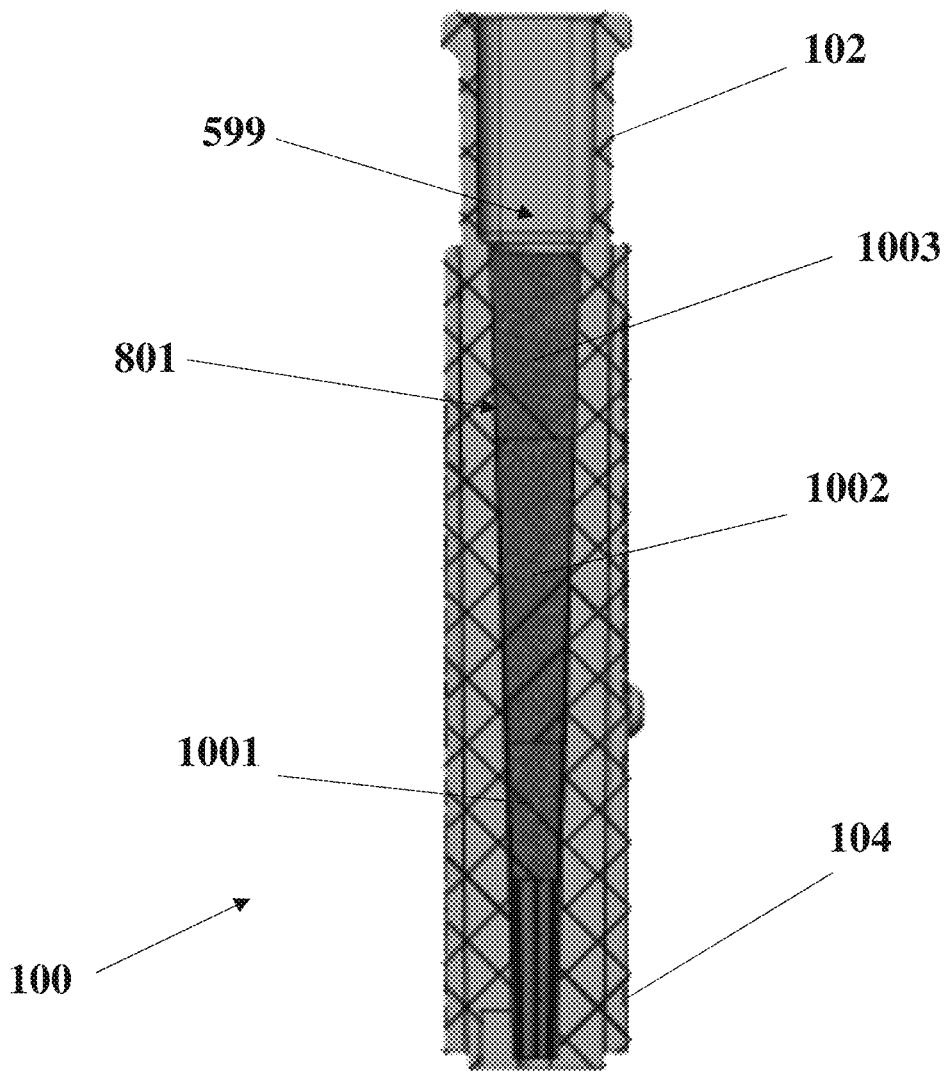
FIG. 16 is an illustration of a cross-section view of one embodiment of the packing device showing that the inner sleeve has been released back into the resting position and the third round of consumable material has been packed on top of the second consumable material in the cone.

FIG. 16 is an illustration of a cross-section view of one embodiment of the packing device showing that the inner sleeve has been released back into the resting position and the third round of consumable material has been packed on top of the second consumable material in the cone. The consumable material 1003 is shown on top of consumable material 1002, which is on top of consumable material 1001, and all three are packed in cone 801. The cone 801 may now be removed as loosely packed, or the device 100 may be articulated up and down one or more times to more tightly pack the consumable materials 1001, 1002, and 1003.

Figure 17:
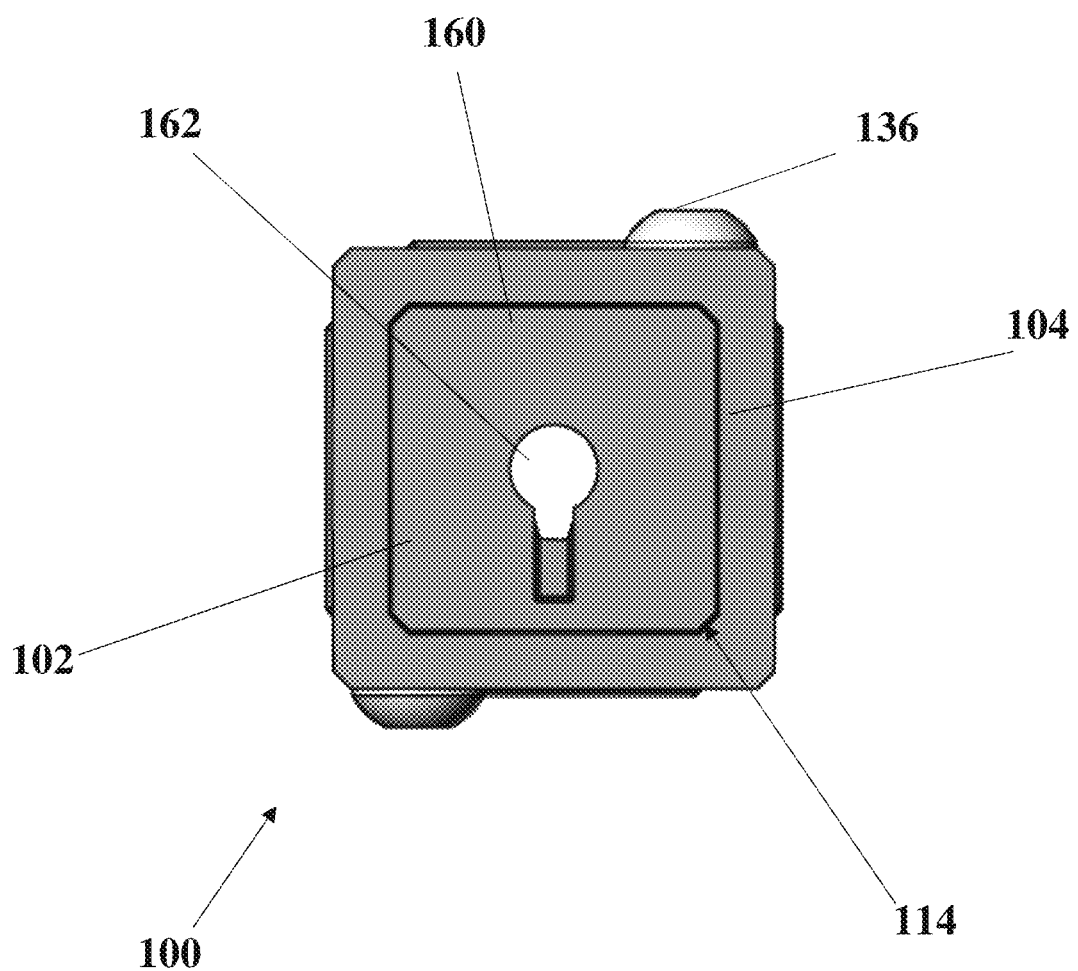
FIG. 17 is an illustration of a bottom plan view of one embodiment of the packing device.

FIG. 17 is an illustration of a bottom plan view of one embodiment of the packing device. Device 100 may comprise outer sleeve 104, inner sleeve 102, and screen heads 136. The inner sleeve 102 and outer sleeve 104 may be configured to fit matingly and telescopically 114, such that they are slideable with respect to each other. The inner sleeve 102 may have a base 160 with an aperture 162. Aperture 162 allows the user to access the interior chamber 199 from the bottom of the device 100.

Figure 18:
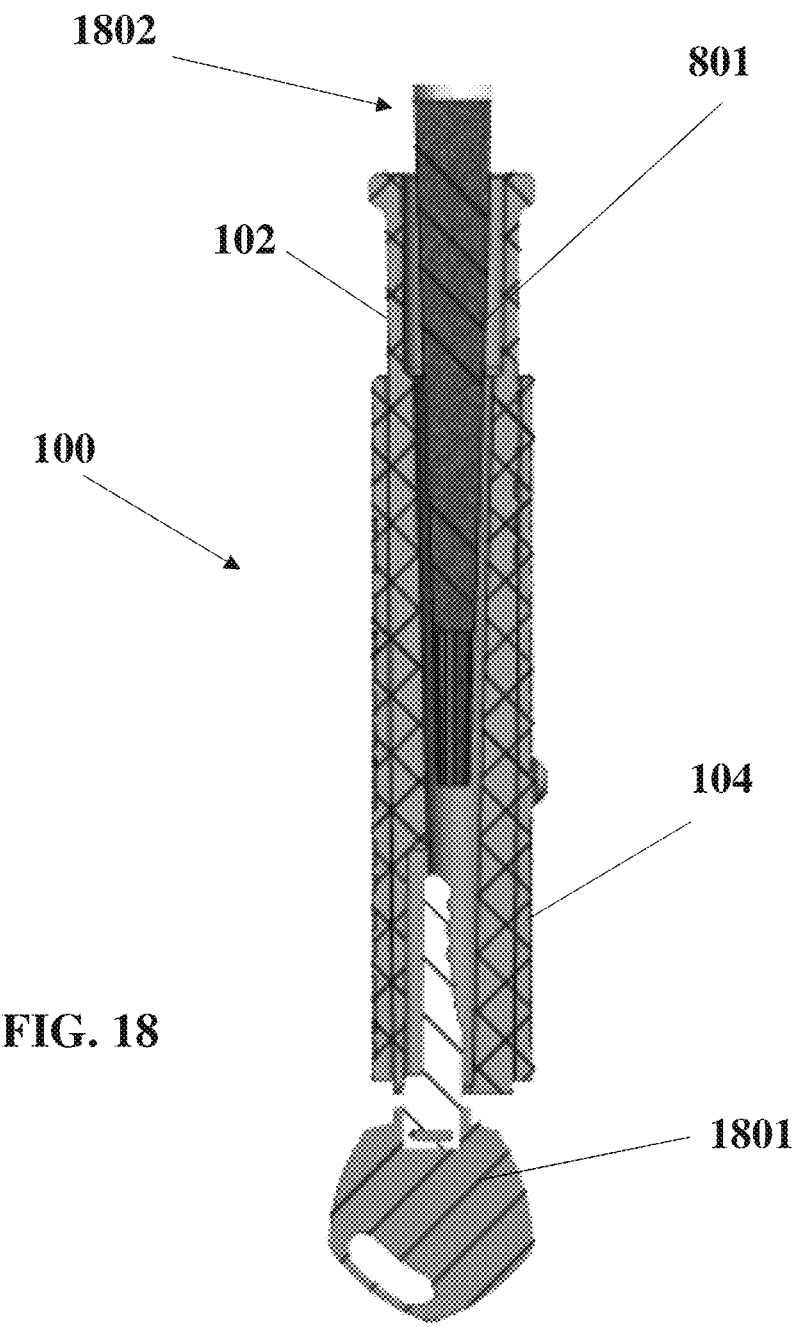
FIG. 18 is an illustration of a cross-section view of one embodiment of the packing device showing that a key has pushed the cone upward so that it can be removed from the packing device.

FIG. 18 is an illustration of a cross-section view of one embodiment of the packing device showing that a key has pushed the cone upward so that it can be removed from the packing device. The packed cone 801 may be removed by pushing the tip of the cone 801 so that a top end 1802 of cone 801 has been pushed out of inner sleeve 102. Any thin hard device may be used to push the tip of cone 801. As shown, a key 1801 may be used. Any type of key that will fit into the opening may be used.

Figure 19:
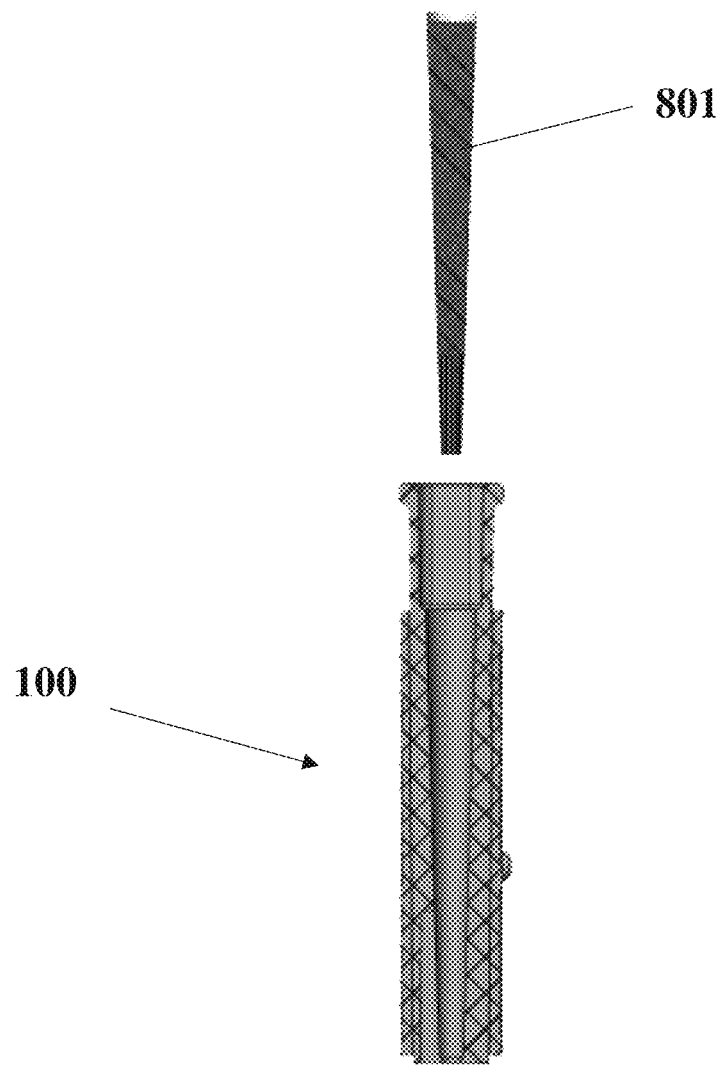
FIG. 19 is an illustration of a cross-section view of one embodiment of the packing device showing that the packed cone has been removed from the packing device.

FIG. 19 is an illustration of a cross-section view of one embodiment of the packing device showing that the packed cone has been removed from the packing device. The cone 801 has been successfully packed with consumable material and has been removed from device 100. A new cone may now be inserted into the device 100.

Figure 20A:
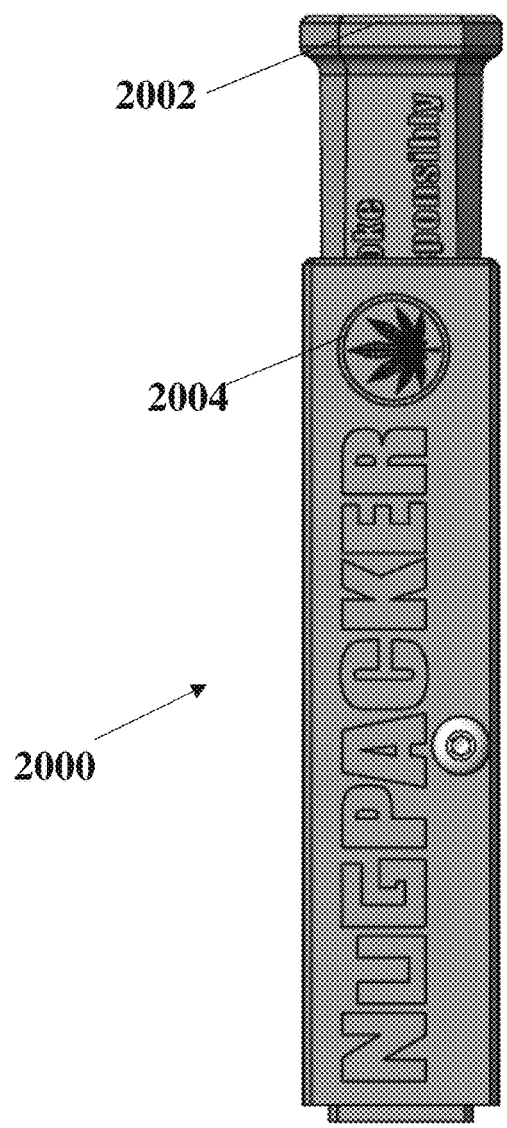
FIG. 20a is an illustration of a side view one embodiment of the packing device in a resting position.

FIG. 20a is an illustration of a side view one embodiment of the packing device in a resting position. The packing device 2000 may comprise inner sleeve 2002 and outer sleeve 2004. FIG. 20a shows the packing device 2000 in its resting position.

Figure 20B:
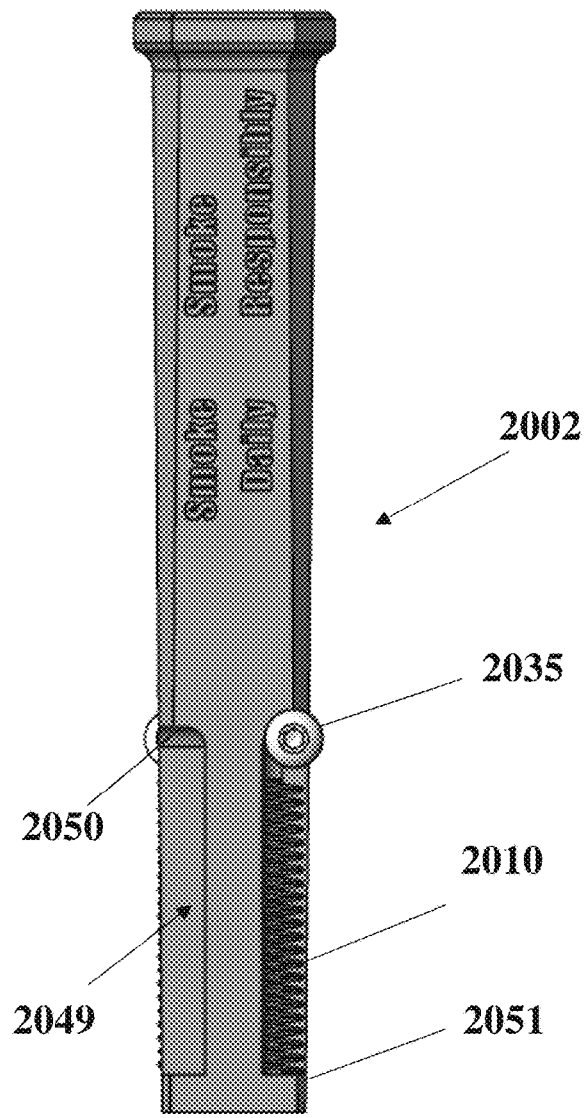
FIG. 20b is an illustration of a side view one embodiment of an inner sleeve of the packing device in a resting position showing that the springs are not compressed.

FIG. 20b is an illustration of a side view one embodiment of an inner sleeve of the packing device in a resting position showing that the springs are not compressed. When the inner sleeve 2002 is in the resting position, the spring 2010 is not compressed and may be nestled in the spring notch 2049 between shoulder 2051 and protrusion 2035, which may be in close proximity to shoulder 2050. The protrusions 2035 are typically part of the outer sleeve 2004 as one or more protrusions on the inner surface of the outer sleeve 2004. However, the protrusions 2035 may be a removable screw, as shown.

Figure 21A:
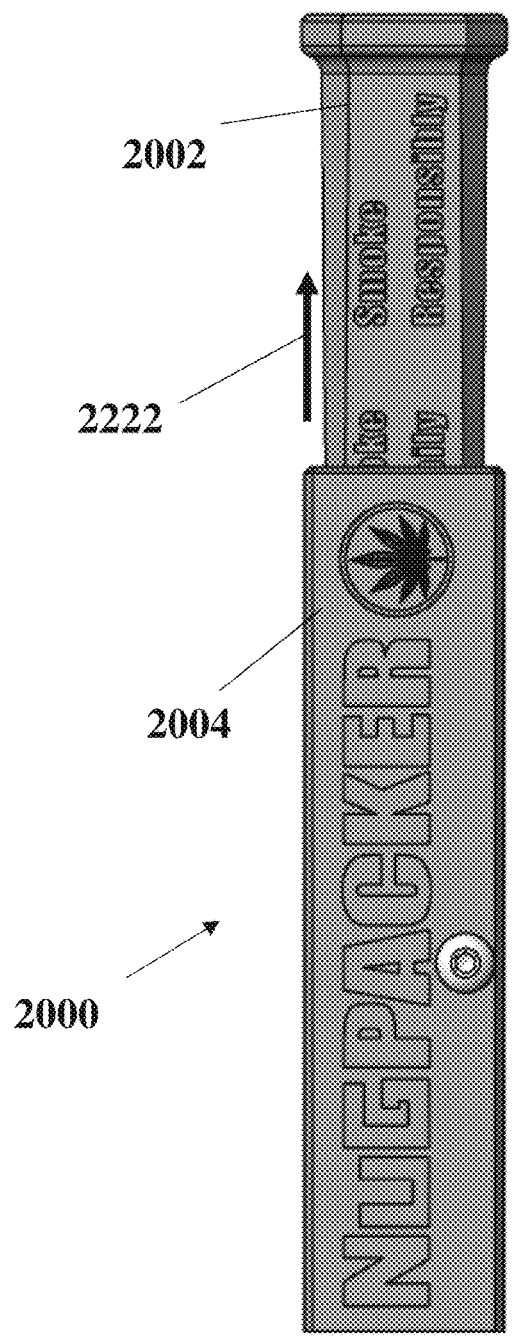
FIG. 21a is an illustration of a side view one embodiment of the packing device in a compressed position.

FIG. 21a is an illustration of a side view one embodiment of the packing device in a compressed position. FIG. 21a shows that when a user pulls up 2222 on the inner sleeve 2002, the device 2000 is put in a compressed position.

Figure 21B:
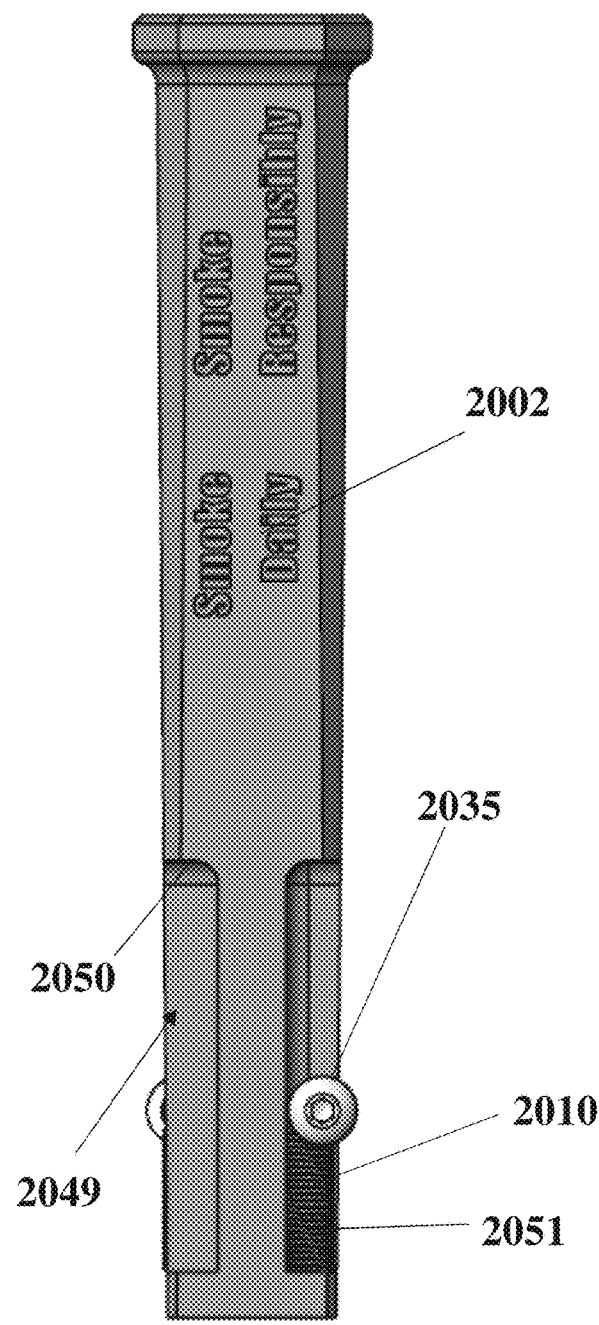
FIG. 21b is an illustration of a side view one embodiment of an inner sleeve of the packing device in a compressed position showing that the springs are compressed.

FIG. 21b is an illustration of a side view one embodiment of an inner sleeve of the packing device in a compressed position showing that the springs are compressed. When in a compressed position, as shown in FIG. 21b, the compression spring 2010 is compressed between protrusion 2035 and shoulder 2051. When the user lets go of the inner sleeve 2002, the spring snaps the inner sleeve back into the resting position. This causes a force, which effectively packs consumable materials into a cone that is loaded into an interior chamber of the inner sleeve.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. The disclosed embodiments capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A packing device for consumable materials, comprising:
   an outer sleeve;
   an inner sleeve; and
   one or more springs;
   wherein said outer sleeve is hollow and is configured to matingly and telescopically engage with said inner sleeve;

wherein said inner sleeve is slideably moveable between a resting position and a compressed position;

wherein said inner sleeve comprises (a) an interior chamber that is configured to engage with a cone and (b) a consumable material loading chamber;

wherein said one or more springs are configured to create a tension when said inner sleeve is slideably moved from said resting position to said compressed position by a user, such that said inner sleeve is slideably biased into said resting position when said inner sleeve is released by said user, such that when a consumable material is loaded into said consumable material loading chamber, said consumable material is packed into said cone;

wherein said outer sleeve comprises one or more protrusions on an inner surface, wherein each of said one or more protrusions are configured to engage with a top of one of said one or more springs, such that when said inner sleeve is slideably moved from the resting position to the compressed position said one or more springs compresses against said one or more protrusions; and wherein said one or more protrusions are removable and pass through said outer sleeve and protrude proximally from said inner surface of said outer sleeve.

2. The packing device of claim 1, wherein said inner sleeve further comprises one or more spring notches that are configured to engage with said one or more springs, such that said one or more springs are held in place and are prevented from deforming laterally when compressed.

3. The packing device of claim 2, wherein each of said one or more spring notches comprise a spring notch top shoulder and a spring notch bottom shoulder, such that there are one or more spring notch top shoulders and one or more spring notch bottom shoulders.

4. The packing device of claim 3, wherein said one or more spring notch bottom shoulders are positioned at a base of said inner sleeve and wherein each of said one or more spring notch bottom shoulders are configured to engage with a bottom of said one or more springs when said inner sleeve is slideably moved from said resting position to said compressed position.

5. The packing device of claim 4, wherein said base of said inner sleeve has an aperture that is configured to allow said user to access said cone in said interior chamber of said inner sleeve.

6. The packing device of claim 5, wherein said base of said inner sleeve is configured to impact a solid flat surface, which allows said user to more densely pack said cone with said consumable material.

7. The packing device of claim 6, wherein said inner sleeve has a top lip.

8. The packing device of claim 1, wherein said device is configured to allow said user to repeatedly articulate said inner sleeve from a resting position to a compressed position in order to more densely pack said cone.

9. The packing device of claim 1, wherein said device is configured to allow said user to repeatedly articulate said inner sleeve from a resting position to a compressed position in order to pack additional batches of said consumable material into said cone.

10. A packing device for consumable materials, comprising:
an outer sleeve;
an inner sleeve;
one or more compression springs; and
one or more protrusion screws;

wherein said outer sleeve is hollow and is configured to matingly and telescopically engage with said inner sleeve;

wherein said inner sleeve matingly and telescopically engages within said outer sleeve and is slideably moveable between a resting position and a compressed position;

wherein said inner sleeve comprises (a) an interior chamber that is configured to engage with a cone, (b) a consumable material loading chamber, and (c) one or more spring notches that are configured to engage with said one or more compression springs, such that said one or more compression springs are held in place and are prevented from deforming laterally when compressed;

wherein said one or more compression springs are configured to create a tension when said inner sleeve is slideably moved from said resting position to said compressed position by a user, such that said inner sleeve is slideably biased into said resting position when said inner sleeve is released by said user, such that when a consumable material is loaded into said consumable material loading chamber, said consumable material is packed into said cone;

wherein said one or more protrusion screws pass through said outer sleeve and protrude proximally from an inner surface of said outer sleeve;

wherein said inner sleeve further comprises one or more spring notches that are configured to engage with said one or more compression springs, such that said one or more compression springs are held in place and are prevented from deforming laterally when compressed;

wherein each of said one or more spring notches comprise a spring notch top shoulder and a spring notch bottom shoulder, such that there are one or more spring notch top shoulders and one or more spring notch bottom shoulders;

wherein said one or more spring notch bottom shoulders are positioned at a base of said inner sleeve and wherein each of said one or more spring notch bottom shoulders are configured to engage with a bottom of said one or more compression springs when said inner sleeve is slideably moved from said resting position to said compressed position;

wherein said base of said inner sleeve has an aperture that is configured to allow said user to access said cone in said interior chamber of said inner sleeve;

wherein said base of said inner sleeve is configured to impact a solid flat surface, which allows said user to more densely pack said cone with said consumable material;

wherein said device is configured to allow said user to repeatedly articulate said inner sleeve from a resting position to a compressed position in order to more densely pack said cone; and wherein said device is configured to allow said user to repeatedly articulate said inner sleeve from a resting position to a compressed position in order to pack additional batches of said consumable material into said cone.

11. A method of packing a consumable material into a cone, comprising the steps:
providing a packing device, wherein said packing device comprises an outer sleeve, an inner sleeve, one or more compression springs, and one or more protrusion screws, wherein said one or more protrusion screws pass through said outer sleeve and protrude proximally from an inner surface of said outer sleeve;

wherein said outer sleeve is hollow and is configured to matingly and telescopically engage with said inner sleeve;

wherein said inner sleeve matingly and telescopically engages within said outer sleeve and is slideably moveable between a resting position and a compressed position;

wherein said inner sleeve comprises (a) an interior chamber that is configured to engage with a cone, (b) a consumable material loading chamber, and (c) one or more spring notches that are configured to engage with said one or more compression springs, such that said one or more compression springs are held in place and are prevented from deforming laterally when compressed;

wherein said one or more compression springs are configured to create a tension when said inner sleeve is slideably moved from said resting position to said compressed position by a user, such that said inner sleeve is slideably biased into said resting position when said inner sleeve is released by said user, such that when a consumable material is loaded into said consumable material loading chamber, said consumable material is packed into said cone;

loading said cone into said inner sleeve;

loading said consumable material into said consumable material loading chamber;

articulating said inner sleeve from said resting position to said compressed position;

releasing said inner sleeve; and repeating said steps of loading said consumable material into said consumable material loading chamber, articulating said inner sleeve from said resting position to said compressed position, and releasing said inner sleeve, such that said inner sleeve snaps back to said resting position, such that said consumable material packs into said cone.

12. The method of packing a consumable material into a cone of claim 11, wherein each of said one or more spring notches comprise a spring notch top shoulder and a spring notch bottom shoulder, such that there are one or more spring notch top shoulders and one or more spring notch bottom shoulders; and wherein said one or more spring notch bottom shoulders are positioned at a base of said inner sleeve and wherein each of said one or more spring notch bottom shoulders are configured to engage with a bottom of said one or more compression springs when said inner sleeve is slideably moved from said resting position to said compressed position.

13. The method of packing a consumable material into a cone of claim 12, wherein said base of said inner sleeve has an aperture that is configured to allow said user to access said cone in said interior chamber of said inner sleeve.

14. The method of packing a consumable material into a cone of claim 13, wherein said base of said inner sleeve is configured to impact a solid flat surface, which allows said user to more densely pack said cone with said consumable material.

15. A packing device for consumable materials, comprising:

an outer sleeve;

an inner sleeve; and one or more springs;

wherein said outer sleeve is hollow and is configured to matingly and telescopically engage with said inner sleeve;

wherein said inner sleeve is slideably moveable between a resting position and a compressed position;

wherein said inner sleeve comprises an interior chamber that is configured to engage with a cone, a consumable material loading chamber, and one or more spring notches;

wherein said one or more springs are configured to create a tension when said inner sleeve is slideably moved from said resting position to said compressed position by a user, such that said inner sleeve is slideably biased into said resting position when said inner sleeve is released by said user, such that when a consumable material is loaded into said consumable material loading chamber, said consumable material is packed into said cone;

wherein said spring notches that are configured to engage with said one or more springs, such that said one or more springs are held in place and are prevented from deforming laterally when compressed;

wherein each of said one or more spring notches comprise a spring notch top shoulder and a spring notch bottom shoulder, such that there are one or more spring notch top shoulders and one or more spring notch bottom shoulders;

wherein said one or more spring notch bottom shoulders are positioned at a base of said inner sleeve and wherein each of said one or more spring notch bottom shoulders are configured to engage with a bottom of said one or more springs when said inner sleeve is slideably moved from said resting position to said compressed position; and wherein said base of said inner sleeve has an aperture that is configured to allow said user to access said cone in said interior chamber of said inner sleeve.

16. The packing device of claim 15, wherein said inner sleeve has a top lip.

17. The packing device of claim 15, wherein said device is configured to allow said user to repeatedly articulate said inner sleeve from a resting position to a compressed position in order to more densely pack said cone.

18. The packing device of claim 15, wherein said device is configured to allow said user to repeatedly articulate said inner sleeve from a resting position to a compressed position in order to pack additional batches of said consumable material into said cone.

* * * * *